Figure 1:
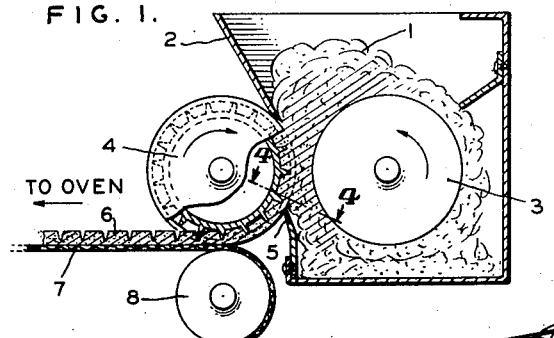

June 3, 1958   H. H. GRICE ET AL   2,837,043
BISCUIT MAKING APPARATUS
Filed May 3, 1956

INVENTORS
HARVEY H. GRICE
HOVEY M. BURGESS.
BY Cameron, Kerkam & Sutton
ATTORNEYS

United States Patent Office 2,837,043
Patented June 3, 1958

2,837,043

BISCUIT MAKING APPARATUS

Harvey H. Grice and Hovey M. Burgess, Kankakee, Ill., assignors to General Foods Corporation, White Plains, N. Y., a corporation of Delaware Application May 3, 1956, Serial No. 582,562

1 Claim. (Cl. 107—8)

The present invention relates to the manufacture of biscuits and more particularly of dog biscuits having rough, unglazed edges permitting rapid absorption of water, milk and other aqueous liquids.

As heretofore prepared, dog biscuits have been characterized by hard baked or glazed surfaces through which water, milk and other aqueous liquids can be absorbed only with difficulty. So-called "kibbled" foods prepared by breaking a baked dough sheet into small pieces can be soaked more quickly because the liquid can enter the pieces through their rough broken edges much more quickly than they can penetrate the glazed biscuit surfaces. On the other hand, the preparation of these "kibbled" foods is attended by the production of an unduly high percentage of fines and broken pieces.

The prior application of Hovey M. Burgess, Serial No. 565,537 filed February 15, 1956, discloses the production of biscuits by forming dough into a sheet of biscuits interconnected only by thin dough sections, baking said sheet, and then snapping the thin interconnecting sections to provide individual biscuits. As in the case of "kibbled" products, the rough, freshly broken edges of such biscuits greatly facilitate absorption of aqueous liquids, while at the same time a uniform product is obtained and losses due to fines and small pieces are greatly reduced. In the preparation of such a dough sheet, it is preferred to employ a dough high in content of hard wheat flour, together with soy bean meal, meat, bone and fish meal, fat, various vitamins and mineral supplements, etc. This dough is formed into a biscuit sheet in which the biscuits are interconnected by thin dough sections about one quarter to one half the thickness of the biscuit. For example, good results are obtained where biscuits about 9/32 of an inch high are interconnected by dough sections about 4/32 of an inch thick. The sheet is then baked, after which it is broken up into separate biscuits by suitable equipment such as a horizontally mounted revolving roll carrying a plurality of fingers.

The present invention relates particularly to a die or cutter for forming biscuit sheets of the type described above in the form of continuous sheets or strips. Two embodiments of the invention have been illustrated in the accompanying drawings, but it is to be expressly understood that said drawings are for purposes of illustration only and are not to be taken as a definition of the limits of the invention, reference being had to the appended claim for this purpose.

Figure 4:
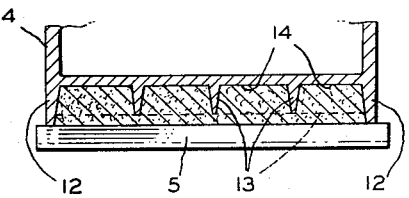
Figure 2:
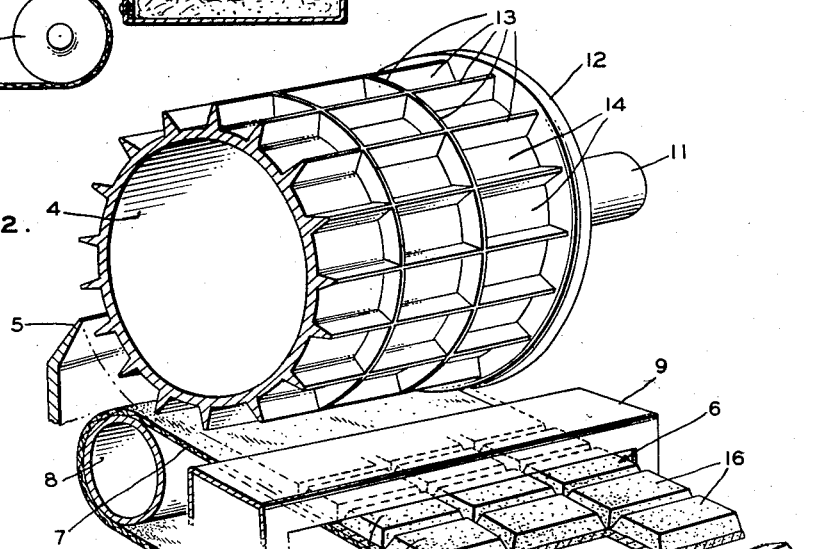
Figure 3:
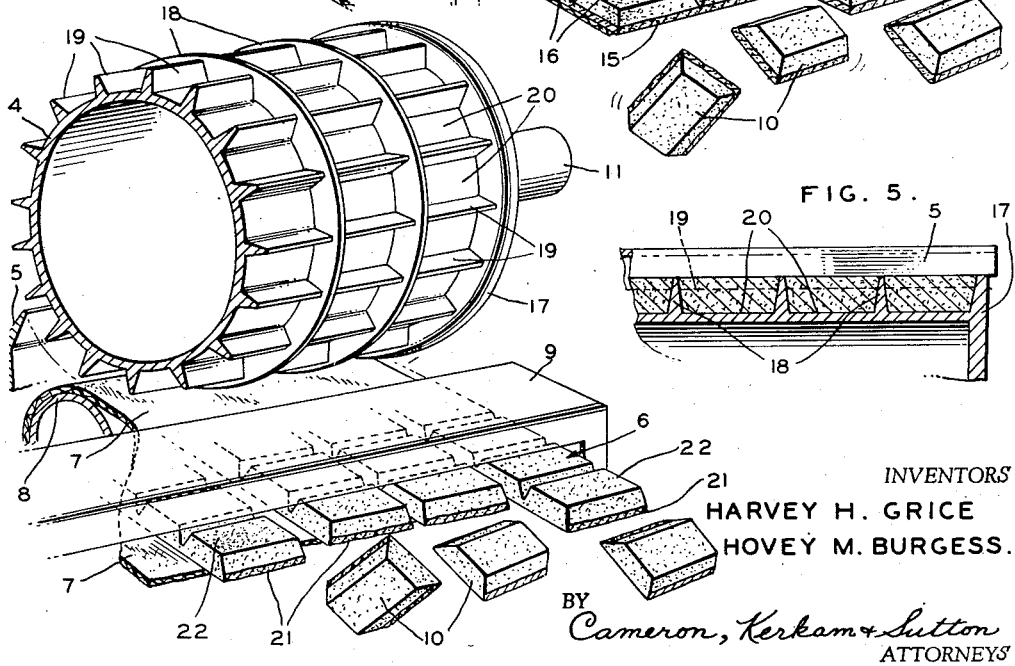
Figure 5:
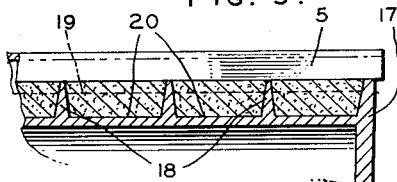

In the drawings,

Fig. 1 is a side view, partly in section, illustrating diagrammatically a die embodying the invention together with associated apparatus;

Figs. 2 and 3 are perspective views, partly in section, illustrating respectively two different dies embodying the invention; and Figs. 4 and 5 are respectively sectional views on radial planes of the dies illustrated in Figs. 2 and 3 respectively, as indicated by the line 4—4 in Fig. 1.

With regard to its general operation, the apparatus shown in the drawings is adapted to carry out continuously the process of said prior application as briefly set forth above. A mass 1 of dough is contained in any suitable hopper 2 to which it may be supplied continuously in any suitable manner. Rotating in the hopper 2 is the usual or any suitable pressure roll 3, preferably a corrugated roll, which opposes a rotating die roll 4 of the type described in detail hereinafter. The outer surface of the die roll comprises a plurality of suitably arranged rib-like projections defining pockets or molds which receive the dough and shape the biscuits. To this end the die roll projects into the hopper 2 through an opening in its wall and the dough mass 1 is fed between the rolls 3 and 4 by their rotation and is pressed into the pockets in the die roll surface. Excess dough is scraped from the surface of the die roll and returned to the hopper 2 by a suitable doctor blade or scraper 5 located below the point of closest approach of the two rolls 3, 4 and conveniently forming a part of the wall of the hopper itself. Beyond the doctor blade 5 and outside the hopper, a molded sheet or strip of dough 6 is stripped from the bottom of the rotating die roll 4 and carried off by any suitable conveying means here shown as a belt 7 passing around a drive roll 8. It will be understood from the foregoing description that the conveyor 7 carries the strip to a suitable baking oven, as indicated diagrammatically at 9 in Figs. 2 and 3, and thence to any suitable breaking mechanism where the strip is broken up into individual biscuits as indicated at 10 in these figures.

Figs. 2–5 inclusive illustrate in greater detail the construction and operation of the die roll and its cooperating doctor blade. The die roll comprises a generally cylindrical structure mounted to rotate in any suitable manner. The die surface can be made up of preformed die members of any desired number, size, and shape which may be connected and supported for rotation in any suitable way. For simplicity, the drawings show a cylindrical die roll of one-piece hollow construction, but it will be understood that any other convenient construction can be employed.

Generally described, the die roll 4 has circumferential ribs in parallel planes which define between them a biscuit-forming space having the width of the continuous strip 6 mentioned above, which width may be that of any desired number of biscuits as hereinafter explained. The space between these ribs is traversed by rib-like projections which form a plurality of dough-receiving pockets or biscuit molds. The doctor blade 5 has scraping engagement with the circumferential ribs and extends across the space therebetween, preferably in a substantially straight line, but the rib-like projections between the circumferential ribs are of less height than the ribs so that their outer edges are spaced from the doctor blade. Thus the rotating roll and blade co-operate to form between the circumferential ribs a continuous strip 6 which is removed from the bottom of the roll as described above, the upper surface of this strip having thereon a plurality of raised biscuit shapes. It will be understood that the strip may be thus subdivided into any desired number of biscuits of any suitable size and shape. In any case, however, the base of the strip is a continuous layer having a thickness equal to the difference in height between the outer edges of the rib-like projections and the outer edges of the circumferential ribs, this layer providing the thin dough sections which interconnect the individual biscuits. As previously stated, the thickness of these sections should be about one quarter to one half the height of the biscuits. Preferably the rib-like projections have thin outer edges and increase in thickness toward their bottoms, i. e., toward the axis of the roll, the degree of taper being such that the strip pulls free from the roll without undue risk of breakage.

Figs. 2 and 4 show a roll for forming a strip having the width of four biscuits. As already stated, the roll 4 is shown as a hollow one-piece cylindrical body having a suitable trunnion or shaft 11 whereby it is mounted for rotation in any suitable manner. The roll 4 is provided at each end with a circumferential rib 12 projecting outwardly from the surface of the roll by a distance equal to the thickness of the biscuits to be made. The doctor blade 5 has scraping engagement with the spaced circumferential ribs 12 and extends across the space therebetween in a straight line as illustrated in Fig. 4.

The space between the ribs 12 is traversed by a plurality of intersecting circumferential and axially extending rib-like projections 13 which intersect one another to form dough-receiving pockets or biscuit molds 14. As shown, the biscuit shapes are rectangular and the strip has the width of four biscuits.

As shown in Fig. 2 and more accurately in Fig. 4, the height of the rib-like projections 13 is less than that of the ribs 12 so that the outer edges of the projections 13 are spaced from the edge of the doctor blade 5. The result is that the projections 13 form grooves extending only partway through the thickness of the mass of dough confined between the ribs 12 and the blade 5. When the continuous strip is removed from the bottom of the roll as illustrated in Fig. 2, therefore, the strip comprises a continuous bottom layer 15 and a plurality of superposed molded biscuit shapes 16 thereon. It will be seen that after baking, when the strip is broken up into individual biscuits, there will be rough, freshly broken edges around the individual biscuits that are the same in width as the thickness of the continuous bottom layer 15. These broken edges facilitate absorption of aqueous liquid as described above, while at the same time excessive break-up of the material into fines is avoided.

As already stated, the continuous biscuit strip 6 may have any desired width and Figs. 3 and 5 illustrate the case in which the strip has the width of a single biscuit only. Preferably, however, the roll is arranged to form a series of such narrow strips side-by-side. These results are accomplished by the roll structure shown in Figs. 3 and 5 which comprises an end circumferential rib 17 and a plurality of similar circumferential ribs 18 all of the same height, said ribs arranged in parallel planes and spaced axially by the width of the narrow strips to be formed or in other words by the width of one biscuit. In this case, therefore, the rib-like projections 19 which traverse the space between each pair of circumferential ribs extend in an axial direction between and interconnect the ribs to provide dough pockets 20, these projections 19 being of less height than the ribs as indicated by the dotted line in Fig. 5.

Because of the scraping engagement of all of the ribs 17 and 18 with the doctor blade 5, a plurality of continuous narrow strips 6 are formed which are shown emerging from the oven 9 in Fig. 3, each of these strips comprising a continuous bottom layer 21 having superposed thereon a series of biscuit forms 22. In this case, when the strips are broken up into individual biscuits, the freshly broken rough edges extend along only two sides of each biscuit.

It will be understood, of course, that the dough-receiving pockets 14 and 20 may be given any desired shape by suitably arranging the rib-like projections such as those shown at 13 and 19. Also different shapes can be provided in side-by-side strips, either as parts of a plural-row strip 6 as shown in Fig. 2 or as separate side-by-side strips 6 as shown in Fig. 3.

While only two embodiments of the invention have been illustrated and described with particularity, it will be understood by those skilled in the art that it is susceptible of other embodiments and that various changes may be made in the form, details of construction, and arrangement of the parts without departing from its spirit. Reference should therefore be had to the appended claim for a definition of the limits of the invention.

What is claimed is:

A biscuit making apparatus comprising a rotatable generally cylindrical die, spaced circumferential ribs on said die extending outwardly therefrom and defining a strip-forming space, circumferential rib-like projections mounted between said circumferential ribs on said die, extending radially outwardly therefrom and dividing said space into a plurality of biscuit strips; axially extending rib-like projections on said die, extending radially outwardly therefrom, traversing said space, and dividing said strips into a plurality of biscuit molds, the outermost ends of said rib-like projections being closer to said die than the outermost ends of said circumferential ribs, scraper means mounted stationary with respect to said rotatable die and bearing a scraping edge lying across the space between and in contact with the peripheral surfaces of said spaced circumferential ribs, along an axis parallel to the die axis so as to scrape against said circumferential ribs, and means for supplying biscuit dough to said space in advance of said scraping edge whereby there may be formed between said circumferential ribs a biscuit sheet of plural biscuit width containing biscuits linked to each other by dough portions of lesser thickness than the thickness of said biscuits.

References Cited in the file of this patent

UNITED STATES PATENTS

| | | |
|---|---|---|
| 309,117 | Willcox | Dec. 9, 1884 |
| 1,971,087 | Werner | Aug. 21, 1934 |
| 2,410,744 | Powers | Nov. 5, 1946 |

FOREIGN PATENTS

| | | |
|---|---|---|
| 248,827 | Great Britain | Mar. 10, 1926 |